United States Patent Office 2,913,136
Patented Nov. 17, 1959

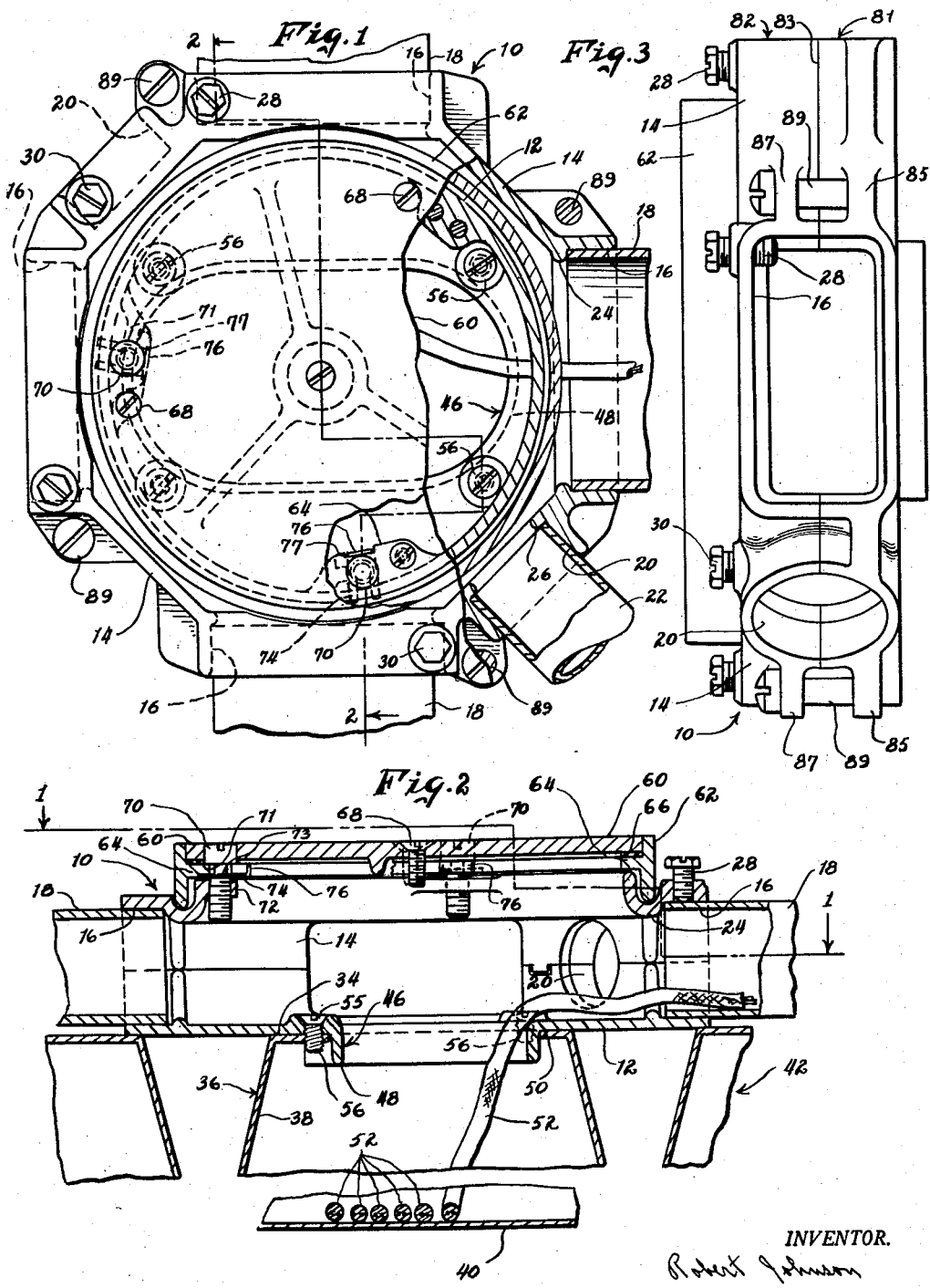

2,913,136

JUNCTION BOX FOR UNDERFLOOR CONDUIT AND DUCT SYSTEMS FOR CELLULAR FLOORS

Robert Johnson, Edgeworth, Pa., assignor, by mesne assignments, to H. K. Porter Company Inc., Pittsburgh, Pa., a corporation of Delaware Application January 29, 1957, Serial No. 637,032

4 Claims. (Cl. 220—3.3)

This invention relates to junction boxes for connecting underfloor duct systems and conduits with the interior of a cell of cellular flooring.

Many modern buildings are constructed with steel floor cells over which concrete is poured. The floor cells contact with one another and provide an impervious structure for supporting the concrete before it hardens. The cells constitute the lower part of the final floor structure. The cells are placed in parallel relation and some types are constructed so that their side walls converge toward the upper part of the cell to a juncture with the top wall of the cell which is substantially narrower than the bottom of the cell.

This leaves space between the cells for concrete and it also results in the top walls of the cells being spaced from one another. The concrete is poured to a substantial depth above the top walls of the cells, and ducts and conduits for underfloor electrical systems are located in the concrete above the tops of the cells.

In floors of cellular construction, it is a common practice to use the floor cells as conduits for electrical conductors and header ducts are placed at right angles to the floor cells, and immediately above the floor cells, for the passage of wires in directions at right angles to the length of the floor cells. Electric outlet fittings are connected with the header ducts at desired locations before the concrete is poured.

Various other types of underfloor electrical systems have been used with concrete floors, and junction boxes of different kinds have been devised for use with the different kinds of underfloor systems.

It is an object of this invention to provide an improved junction box which can be used for combining underfloor duct systems, underfloor conduit systems, and cellular floor duct systems together in various relations, and with simple and inexpensive apparatus. It is another object of the invention to provide an improved junction box which is more versatile in the uses to which it can be put in underfloor electrical systems; and it is still another object of the invention to combine the improved junction box with a cellular floor construction in a manner to connect the interior of the floor cell with the different types of underfloor electrical systems which may be embedded in the concrete above the cells.

Other objects, features and advantages of the invention will appear or be pointed out as the description proceeds.

In the drawing, forming a part hereof, in which like reference characters indicate corresponding parts in all the views;

Figure 1 is a top plan view, partly broken away and in section, of a junction box embodying this invention; the section being on the line 1—1 of Figure 2;

Figure 2 is a sectional view through the junction box, on the line 2—2 of Figure 1, and with the junction box located in assembled relation with a floor cell of a cellular flooring construction; and Figure 3 is an end view of the junction box shown in Figure 1 with the duct and conduit removed.

Figure 1 shows a junction box 10 having a bottom 12 and side walls 14. There is at least one opening 16 shaped to receive an underfloor duct 18 which is generally rectangular in cross section with the corners rounded.

There is also at least one opening 20 shaped to receive an end of a conduit 22. The conduits for electrical wiring are of round cross section. In order to provide a stop or abutment for limiting the extent to which the duct 18 and conduit 22 are inserted into the openings 16 and 20, respectively, there is a shoulder 24 in the opening 16 and a corresponding shoulder 26 in the opening 20.

Means are provided for preventing displacement of the duct 18 and conduit 22 from the junction box after they have been assembled with the junction box. In the preferred construction, this means consists of set screws. A set screw 28 (Figure 2) threads through the top wall of the opening 16 and bears against the top of the duct 18. A corresponding set screw 30 (Figure 3) threads through the top wall of the opening 20 and into contact with the conduit which is inserted into this opening.

The junction box 10 has a plurality of openings at different locations around its perimeter for receiving ducts and conduits extending in different directions. In the construction illustrated, there are four openings 16 for receiving ducts and there are two openings 20 for receiving conduits. This construction is merely illustrative of a junction box having a plurality of openings for ducts and a plurality of openings for conduits.

The junction box 10 rests on a top wall 34 of a floor cell 36. The cellular floor construction is best shown in Figure 2. The floor cell 36 has side walls 38 which converge toward their upper ends where they join the top wall 34. The bottom of the floor cell 36 is indicated by the reference character 40, and this bottom 40 has its side edge in contact with the opposite edge of the bottom of a next adjacent floor cell 42 which is of similar construction to the floor cell 36 and parallel to it. It will be understood that there is another corresponding floor cell along the left edge of the floor cell 36 and that the entire cellular floor is made up of a group of such parallel cells over which the concrete is poured to make the final floor.

The junction box 10 has an elongated opening 46 in its bottom wall. This elongated opening 46 has a width approximately equal to but slightly less than the width of the top wall 34 of the floor cell; and the opening 46 has an edge portion 48 which turns downwardly through an angle of preferably at least 90° to provide a vertical extent for the edge portion 48 within an opening 50 through the top wall 34 of the floor cell.

The purpose of this downwardly extending edge portion 48 is to provide guide means for preventing the insulation of a conductor 52 from striking the edges of the opening 50 since the edges of this opening 50 are likely to be sharp enough to damage the insulation of the conductor when it is being pulled through the passages of the electrical system. The lower edge of the downturned edge portion 48 is preferably rounded so that it cannot damage insulation of any conductor which rubs across it while being pulled through the system.

The bottom of the edge portion 48 can be effectively rounded and smoothed when the junction box is manufactured at the factory, but the edges of the opening 50 in the floor cell are likely to be sharp and burred because this opening 50 is cut in the floor cell on the job and usually with a circular saw. It is not practical to provide openings, such as the opening 50, when the floor cells are originally manufactured because the location of the desired openings in the floor cells are not known to the manufacturer, and it would not be practical to try to reserve particular floor cells for particular locations when constructing a cellular floor.

The opening 46 can be made narrower than shown, but it cannot be made wider than the top wall 34 of the floor cell. In order to increase the open area and thus provide more space for reaching down into a floor cell to pull additional wires or conductors, the opening 46 is made substantially longer than it is wide, and the length of this opening 46 is preferably as great as practical within the limits of the box diameter.

In the construction shown, the elongated opening 46 cannot be made equal to the full diameter of the interior of the box because the box is equipped with other openings 55 for fastening means, preferably screws 56, for attaching the box to the top wall of the floor cell. These screws 56 are within the confines of an area which is directly over the top wall of the floor cell; and with the opening 46 almost as wide as the top wall of the floor cell throughout most of the length of the opening 46, it is necessary to have the opening 46 of reduced width toward the ends where the screws 56 are located.

In the preferred construction, the ends of the opening 46 are rounded and the screws 56 are located adjacent to the elongated opening 46 at locations where this opening is of reduced width. These screws 56 are preferably self-tapping screws so that it is merely necessary to drill holes through the top wall of the floor cell and then drive the screws 56 into these holes, the threads being cut by the screws in the top wall of the cell as the screws advance. Other means for attaching the junction box to the floor cell can be used and the screws 56 are merely representative of such means.

The top of the junction box is closed by a cover plate 60 which fits within an adjusting ring 62. There is an inwardly extending flange 64 in position to support the cover plate 60 with its top surface of the cover plate substantially flush with the top edge of the adjusting ring 62. A gasket 66 is located between the cover plate 60 and the top surface of the inwardly extending flange 64. The cover plate 60 is attached to the adjusting ring 62 by screws 68 which thread into the flange 64 at locations where the flange is made slightly wider to receive the screws 68. These screws 68 have their heads countersunk in the cover plate 60.

The adjusting ring 62 is attached to the junction box 10 by screws 70 which extend through slots 71 (Fig. 1) in the flange 64 and thread into lugs 72 (Fig. 2) projecting inwardly from the side walls of the junction box at angularly spaced regions around the circumferential extent of the junction box. These screws 70 have heads of larger diameter than the width of the slots 71, and these heads of the screws 70 extend through openings in the cover plate 60 and have their upper ends flush with the top surface of the cover plate. This makes the screws 70 accessible from above the box, even though the cover is on, for adjusting the ring 62. The flange 64 is of increased width at the regions where the flange receives the screws 70.

Each of the screws 70 is of reduced diameter where is passes through the slot 71 and there is a shoulder 73 immediately below the slot where the screw 70 again increases to its full diameter. The diameter of this shoulder is greater than the width of the slot 71. Rotation of any one of the screws 70 in a direction to cause it to rise with respect to the lug 72, therefore, brings the shoulder 73 up against the underside of the flange 64 and raises the adjusting ring 62. Conversely, rotation of the screw 70 in the opposite direction lowers the adjusting ring 62.

The screws 70 are held against displacement lengthwise of the slots 71 by retaining clips 74 (Fig. 1). Each of these clips 74 is of spring material and has a U-shaped end that receives the screw and that snaps around the reduced diameter portion of the screw above the shoulder 73. The clip 74 has a tab 76 at its inner end extending at right angles to the U-shaped portion and upwardly into a notch 77 (Fig. 1) in the front face of the lug 72.

In order to level the adjusting ring 62, and to vary its height to make the top surface of the cover plate 60 flush with the screed line of the concrete floor, leveling screws 70 are provided at three angularly spaced regions around the circumference of the junction box.

The junction box 10 is preferably made in two parts, as best shown in Figure 3. There is a lower part 81 and an upper part 82. These parts join along a division surface 83. There are projections 85 on the lower part 81 below corresponding projections 87 on the upper part 82. The parts 81 and 82 are connected together by screws 89 which extend freely through openings in the projections 87 and thread into openings in the projections 85.

In the construction illustrated, there are four such screws 89 for holding the parts of the junction box together and these screws are preferably located near the set screws 30 which secure the ducts 18 to the junction box.

The preferred embodiment of the invention has been illustrated and described, but changes and modifications can be made, and some features can be used in different combinations without departing from the invention as defined in the claims.

What is claimed is:

1. An underfloor duct system including a junction box comprising bottom and side walls, there being openings in the side walls shaped to receive ends of ducts, the bottom of the box having an elongated opening therein, cellular flooring that has longitudinally extending and parallel cells each of which has a top wall of predetermined width spaced from the corresponding top walls of the next adjacent cells, the box being supported by the top wall of one of the cells which has an opening in said top wall elongated in the direction of extent of the cell and longer than the width of the top wall, the box being substantially centered transversely on the top wall on which it is supported, and in which the opening in the bottom of the box is elongated in the direction of extent of the cell and of a length substantially greater than the width of the top wall of the cell and of a width somewhat less than the width of the top wall of the cell on which the box is supported, the opening in the bottom of the box being in register with the opening in the top wall of the cell, and the box has a plurality of fastening means extending through holes in its bottom and adjacent to the elongated opening for connecting the box to the top wall of the cell.

2. An underfloor duct system including cellular flooring having a cell with an elongated top wall, a junction box for connecting underfloor tubular electric conductor housings with the interior of the cell of said cellular flooring, said box having side walls with openings therein for receiving the ends of the conductor housings, and said box being supported from the top wall of the cell and having a generally circular bottom with an opening therein for communicating with the interior of a floor cell through an opening in the top wall of the cell elongated in the direction of the length of the cell, the opening in the bottom of the box being similarly elongated to a length equal to almost the full diameter of the bottom of the box and having a width substantially less than the diameter of the bottom and somewhat less than that of the top wall of the cell with which the box is connected, the elongated opening in the bottom of the box having edge portions that extend downwardly below the bottom of the box and with running clearance through the opening in the top wall of the cell, the elongated opening in the box having ends of reduced width, and the bottom of the box having holes therein at opposite sides of the elongated opening in the box, for receiving fastening elements that connect the box to the floor cell, the holes being spaced from one another by a transverse distance less than the transverse width across the downwardly extending edge portions of the elongated opening in the box, and said holes being located near the elongated opening and at locations where the opening is of reduced width so as to locate all of said holes over the top of the cell with which the junction box communicates.

3. The underfloor duct system described in claim 2, and in which the reduced width of the elongated opening through the bottom of the box consists of rounded ends of the opening and the opening has edge portions that turn downwardly into a substantially vertical direction below the bottom of the box and that project through an opening in the top wall of the cell when the box is in its intended assembled relation with the cellular flooring.

4. The underfloor duct system described in claim 2, and in which the edge portions that extend downwardly below the bottom of the box turn downwardly through an angle of at least 90° into a substantially vertical direction at a location below the bottom of the box to provide a guide within the opening through the top wall of the floor cell for preventing conductors in the floor cell from striking the edges of the opening in the floor cell when the conductors are pulled upwardly from the floor cell into the junction box.

References Cited in the file of this patent

UNITED STATES PATENTS

| | | |
|---|---|---|
| 788,880 | Bossert | May 2, 1905 |
| 1,533,759 | Richardson et al. | Apr. 14, 1925 |
| 1,949,883 | Sharp | Mar. 6, 1934 |
| 2,043,648 | Bissell et al. | June 9, 1936 |
| 2,063,569 | Walker | Dec. 8, 1936 |
| 2,657,250 | Wiesmann | Oct. 27, 1953 |
| 2,735,166 | Hoseason | Feb. 21, 1956 |